(12) United States Patent
Olsen et al.

(10) Patent No.: US 10,679,173 B2
(45) Date of Patent: Jun. 9, 2020

(54) END TO END LOGISTIC CHAIN TRACKING AND CONTROL OF SHIPPING CONTAINERS

(71) Applicant: RPMAnetworks Holding, Grand Cayman (KY)

(72) Inventors: Jan Olsen, Dubai (AE); Frederic Lyman Wohl, Dubai Internet City (AE)

(73) Assignee: RPMANETWORKS HOLDINGS, Grand Cayman (KY)

( * ) Notice: Subject to any disclaimer, the term of this patent is extended or adjusted under 35 U.S.C. 154(b) by 0 days.

(21) Appl. No.: 16/278,949

(22) Filed: Feb. 19, 2019

(65) Prior Publication Data

US 2019/0258993 A1    Aug. 22, 2019

Related U.S. Application Data

(60) Provisional application No. 62/683,510, filed on Jun. 11, 2018, provisional application No. 62/632,353, filed on Feb. 19, 2018.

(51) Int. Cl.
*G06Q 50/28* (2012.01)
*G06Q 10/08* (2012.01)
(Continued)

(52) U.S. Cl.
CPC ..... *G06Q 10/0833* (2013.01); *G06Q 10/0831* (2013.01); *G06Q 10/0835* (2013.01);
(Continued)

(58) Field of Classification Search
CPC .. G06Q 10/08; G06Q 10/083; G06Q 10/0833; G06Q 50/28; G06Q 50/30;
(Continued)

(56) References Cited

U.S. PATENT DOCUMENTS 5,424,720 A   6/1995  Kirkpatrick
5,565,858 A   10/1996 Guthrie
(Continued)

*Primary Examiner* — Benyam Haile
(74) *Attorney, Agent, or Firm* — Pilloff Passino & Cosenza LLP; Sean A. Passino; Rachel K. Pilloff

(57) ABSTRACT

Disclosed is a system and method for providing end to end logistic chain control and tracking during shipping by utilizing a cost-efficient and reliable RPMA wireless network technology. The system consists of a wireless, self-powered device connected to shipping container containing goods for transportation and a variety of required sensors to sense the conditions of the goods inside the container. The container related information is transmitted in real-time or in near real-time to customer end in the following sequence: Device to RPMA Access points to Data center via satellite backhaul connectivity to Customer's Platform. The present system also enables the customers to take an intelligent action to control cargo container, if required. The present invention relates to a system and method of providing a wireless, self-powered system for end to end logistic chain tracking and control of shipping containers over sea, land, air by utilizing a low-power, wide-area communication technology, particularly Random Phase Multiple Access (RPMA) communication network and data processing and/or storage network technology.

9 Claims, 2 Drawing Sheets

(51) Int. Cl.
*H04W 4/02* (2018.01)
*G06Q 50/30* (2012.01)
*G07C 9/00* (2020.01)
*G08B 25/10* (2006.01)

(52) U.S. Cl.
CPC ............ *H04W 4/025* (2013.01); *G06Q 10/08* (2013.01); *G06Q 50/28* (2013.01); *G06Q 50/30* (2013.01); *G07C 9/00174* (2013.01); *G08B 25/10* (2013.01)

(58) Field of Classification Search
CPC .... G07C 9/00174; G08B 25/00; G08B 25/01; G08B 25/10; G08B 25/009; H04W 4/029
See application file for complete search history.

(56) References Cited

U.S. PATENT DOCUMENTS

| | | |
|---|---|---|
| 5,712,789 A | 1/1998 | Radican |
| 5,804,810 A | 9/1998 | Woolley et al. |
| 5,894,266 A | 4/1999 | Wood, Jr. et al. |
| 6,281,797 B1 | 8/2001 | Forster et al. |
| 6,753,775 B2 | 6/2004 | Auerbach et al. |
| 6,919,803 B2 | 7/2005 | Breed |
| 6,972,682 B2 | 12/2005 | Lareau et al. |
| 7,154,390 B2 | 12/2006 | Giermanski et al. |
| 7,212,829 B1 | 5/2007 | Lau et al. |
| 7,265,668 B1 | 9/2007 | Brosius |
| 7,339,469 B2 | 3/2008 | Braun |
| 7,455,225 B1 | 11/2008 | Hadfield et al. |
| 7,586,409 B2 | 9/2009 | Armstrong et al. |
| 7,592,916 B2 | 9/2009 | Staples |
| 7,623,029 B2 | 11/2009 | Meyers |
| 7,702,327 B2 | 4/2010 | O'Toole et al. |
| 7,714,708 B2 | 5/2010 | Brackmann et al. |
| 7,872,583 B1 | 1/2011 | Yushkov et al. |
| 7,974,637 B1 | 7/2011 | Taveniku |
| 8,009,034 B2 | 8/2011 | Dobson et al. |
| 8,239,169 B2 | 8/2012 | Gregory et al. |
| 8,279,067 B2 | 10/2012 | Berger et al. |
| 8,299,920 B2 | 10/2012 | Hamm et al. |
| 8,392,296 B2 | 3/2013 | Powers et al. |
| 8,456,302 B2 | 6/2013 | Stevens |
| 8,907,793 B2 | 12/2014 | Mostov |
| 8,959,036 B2 | 2/2015 | Huat |
| 9,019,096 B2 | 4/2015 | Cordaro et al. |
| 9,127,945 B2 | 9/2015 | Telang et al. |
| 9,501,920 B2 | 11/2016 | Harring et al. |
| 2002/0095308 A1 | 7/2002 | Pragelas et al. |
| 2003/0050038 A1 | 3/2003 | Haave et al. |
| 2004/0041706 A1 | 3/2004 | Stratmoen et al. |
| 2004/0174259 A1 | 9/2004 | Peel et al. |
| 2004/0227630 A1 | 11/2004 | Shannon et al. |
| 2004/0233041 A1 | 11/2004 | Bohman et al. |
| 2006/0033616 A1 | 2/2006 | Silva et al. |
| 2006/0047419 A1 | 3/2006 | Diendort et al. |
| 2006/0164239 A1 | 7/2006 | Loda |
| 2006/0290491 A1* | 12/2006 | Wagner ................. G06Q 10/08 340/539.26 |
| 2007/0040647 A1 | 2/2007 | Saenz et al. |
| 2007/0103297 A1 | 5/2007 | Armstrong et al. |
| 2007/0124020 A1 | 5/2007 | Staples |
| 2007/0216542 A1 | 9/2007 | Brosius et al. |
| 2007/0273503 A1 | 11/2007 | Twitchell, Jr. |
| 2008/0055075 A1 | 3/2008 | Fano |
| 2008/0073422 A1 | 3/2008 | Zhou |
| 2008/0125965 A1 | 5/2008 | Carani et al. |
| 2008/0186163 A1 | 8/2008 | Mills |
| 2008/0231438 A1 | 9/2008 | Curcio |
| 2008/0231454 A1 | 9/2008 | Curcio |
| 2009/0135015 A1 | 5/2009 | Dobson et al. |
| 2009/0189788 A1 | 7/2009 | Faus et al. |
| 2009/0201152 A1 | 8/2009 | Karr et al. |
| 2010/0127867 A1 | 5/2010 | Chien et al. |
| 2010/0132148 A1 | 6/2010 | Carangelo |
| 2010/0332359 A1 | 12/2010 | Powers et al. |
| 2012/0252488 A1 | 10/2012 | Hartmann et al. |
| 2012/0262272 A1 | 10/2012 | Donlan et al. |
| 2012/0262307 A1 | 10/2012 | Poon |
| 2013/0016636 A1 | 1/2013 | Berger et al. |
| 2014/0067708 A1 | 3/2014 | Lau et al. |
| 2016/0117059 A1 | 4/2016 | Folken et al. |
| 2016/0307433 A1 | 10/2016 | Hänggi |
| 2017/0082823 A1 | 3/2017 | Hwang et al. |
| 2017/0285623 A1* | 10/2017 | Figoli ................ G05B 19/0423 |
| 2018/0011638 A1 | 1/2018 | Liu et al. |
| 2018/0060809 A1 | 3/2018 | Seaman et al. |

* cited by examiner

END TO END LOGISTIC CHAIN TRACKING AND CONTROL OF SHIPPING CONTAINERS

CROSS-REFERENCE TO RELATED APPLICATIONS

This application claims priority from U.S. Provisional Application No. 62/632,353, filed Feb. 19, 2018, and U.S. Provisional Application No. 62/683,510, filed Jun. 11, 2018, the contents of which are incorporated herein by reference in their entirety.

TECHNICAL FIELD

The present invention relates to a system and method of providing a wireless, self-powered system for end to end logistic chain tracking and control of shipping containers over sea, land, air by utilizing a low-power, wide-area communication technology, particularly Random Phase Multiple Access (RPMA) communication network and data processing and/or storage network technology.

BACKGROUND

To transport a number of stuff from one place to other, there exists a number of transportation modes such as ships, truck, airfreight and with these transportation mode, fear of theft during transit, fear of inventory loss, unauthorized access to the container etc. can be felt. It is almost certain that the person shipping or receiving these items are anxious to some degree and he sits in restlessness till the transported container containing transporting goods are received safely. But if shipping container can be tracked and controlled remotely during transit then it will certainly make above transportation modes more secure and reliable. Also, if the shipping container can be tracked and controlled remotely during each transport segment or when shipments is being shipped, then in that case shipping journey will be more secured, reliable and relieved. Currently, satellite systems are used to track container by pulling up the satellite images of the transported container at any time and relayed the images back to the base station. This simple system of container tracking via satellite access is easy and available everywhere but they are not able to provide a controlled end to end logistic transportation and tracking of container because of number of complexities associated with the transportation of container containing goods More particularly it does not provide a controlled end-to-end solution because most shipments involve a number of shipping transport segments as well as a number of other complexities such as shipping containers not always being visible to the satellite.

The present invention not only provides solutions to the existing complexities but also enable the control centre in making intelligent decision in case of any container anomaly.

The present invention gives a solution for end-to-end transportation across multiple shipping transport segments but it also provides solutions to the existing complexities, and enables authorized control centers to make intelligent decisions while the shipping container is still in-transit in case container anomalies are found during a shipping segment

REFERENCES

U.S. Pat. No. 5,424,720A discloses a refrigerated vehicle system is particularly adapted for use with refrigerated tractor/trailer and rail car vehicles to provide data on the operation of the vehicle and to monitor and provide a record of the operation of ancillary equipment important in the proper refrigeration of the vehicle. With refrigerated vehicles, the system can provide records of the temperatures of articles when loaded into the refrigerated vehicle, throughout their transportation and upon delivery from the vehicle and can monitor refrigerated vehicles, store information on the refrigeration of the vehicles, including time/temperature records and information of the operation and status of refrigeration system components, and output such information to remote and distant locations.

U.S. Pat. No. 5,565,858A:—A device which locates a container from a group of containers utilizing an electronic tag, the electronic tag is capable of being positioned in close proximity to one of the containers. The electronic tag includes at least one long range transceiver portion and at least one short range transceiver portion. Each long range transceiver portion is capable of communicating with either a short range transceiver portion associated with another electronic tag, or an interrogator unit. Each short range transceiver portion is capable of communicating with a long range transceiver portion of another electronic tag. The device assists in locating a container, relative to other containers, when the containers are stored in a stacked or nested configuration. A global positioning system (GPS) can be utilized to locate the position of the containers on the Earth's surface.

U.S. Pat. No. 5,712,789A:—A container monitoring system and method tracks location and load status of shipping containers within a defined premises and generates container status reports for customers receiving containers, suppliers or shippers of goods, and container carriers. Carrier and container identifiers are used to track and monitor movements and status of each container from a point of departure to a final destination and return. A combined computer and telecommunications system is also disclosed for executing the tasks of the container monitoring system.

U.S. Pat. No. 6,753,775B2:—A remotely monitorable shipping container including a shipping container body having associated therewith at least one door and at least one door latch having a latch locking element arranged for locking engagement with a door mounted locking element, at least one wireless communicator mounted in a secure location within the shipping container and being operative to wirelessly transmit information to a remote monitor regarding the status of an electronic seal mounted onto the locking element for confirming locking of the at least one door, and at least one wireless antenna mounted within a protected enclosure on the outside of the shipping container for transmitting the information from the at least one wireless communicator.

US20070124020A1:—The system of the preferred embodiment includes a container that functions to hold objects for shipping and storage; a sensor system coupled to the container that functions to detect the state of the container and an area surrounding the container; an output element that functions to display the detected information; a power supply that functions to collect, convert, store, and supply energy to the elements of the system; and a processor that functions to collect and store detected information from the sensors in order to connect the power supply to the elements of the system and to supply power to these elements on an as-needed basis to conserve energy.

US20090201152A1:—The present disclosure relates to location and communication systems that can be utilized for locating cargo containers using tags with a radio communication subsystem in the form of a transponder or microtransponder. Each cargo container tag (CCT) is capable of communicating with either other cargo container tags or a base-station (BS) locator devices. The tags can be arranged for tracking the opening and closing of doors on individual cargo containers using radio communication methods. Lost cargo container can be located using communications from a base station and the cargo container tags. CCT devices can also detect intrusions and/or tampering with cargo containers, and store a variety of collected data for later retrieval.

U.S. Pat. No. 7,872,583B1:—A method and system for a long range Radio Frequency (RF)-based identification, tracking and locating of objects. The method and system use a narrow bandwidth ranging signal(s), including VHF of lower frequency bands, which minimizes propagation loss and loss of accuracy of the RF locating signals. The method and system includes narrow bandwidth ranging signal multipath mitigations processor, which further improves the track-locate accuracy. The signal is sent from a Master Unit(s) to a Tag. The signal traveling time is recorded and the distance between the Master(s) and the Tag is calculated. The method and system allow achieving a longer distance of the RF narrow bandwidth ranging signal penetration and an increased accuracy by using VHF bands in conjunction with the narrow bandwidth ranging signal multi-path mitigations processor. The techniques of Digital Signal Processing and Software-Defined Radio are used. The actual waveforms transmitted and received by the radios are defined by the software. The roles of the Master Unit(s) and the Tag can be reversed.

Overall in present scenario satellite systems are used to track shipping containers during a single shipping transport segment by pulling up the satellite images of the transported container and its carrier at any time during the transport, and relaying the images back to the satellite's base station. This simple prior art system is easy and available everywhere, but it does not provide a controlled end-to-end solution because most shipments involve a number of shipping transport segments as well as a number of other complexities such as shipping containers not always being visible to the satellite.

The present invention not only provides a solution for end-to-end transportation across multiple shipping transport segments but it also provides solutions to the existing complexities, and enables authorized control centers to make intelligent decisions while the shipping container is still in-transit in case container anomalies are found during a shipping segment.

It is submitted that the present invention substantially diverges in the design elements from the prior art, and consequently it is clear that there is a need in the art for an improvement to existing logistic chain control and tracking over shipping systems and device. In this regard the instant invention substantially fulfills these needs.

DEFINITIONS

The following paragraphs contain key definitions for the present invention.

The "RPMA Device" herein refers to the device that put one to each container, an RPMA wireless network technology which communicates with this device, and a networked remote data storage system.

The "RPMA Access point (AP)" herein refers to a networking hardware device that allows other Wi-Fi devices to connect to a wired network. The "AP" usually connects to a router (via a wired network) as a standalone device, but it can also be an integral component of the router itself. The present invention make use of one or more RPMA access points (AP) on-board container cargo to which the device communicates to transmit container information to the customer end.

"The RPMA Concentrator" herein can be defined as a device that acts as an efficient forwarder of data transmission signals. A remote access hub is sometimes referred to as a concentrator that handles incoming data for an Internet (or other network) point-of-presence and performs other services. In the present invention RPMA concentrator is the key component in communicating sensors data with customer's platform. It has a RPMA chip with a unique MAC address and is placed in each container to communicate each container's sensors data to customer's platform via RPMA wireless communication.

The "MAC address" herein can be submitted as a media access control address (MAC address) of a device which is a unique identifier assigned to a network interface controller (NIC) for communications at the data link layer of a network segment. MAC addresses are used as a network address for most IEEE 802 network technologies, including Ethernet, Wi-Fi and Bluetooth.

The "satellite backhaul" herein refers to a communication, wherein the backhaul is used to mean getting data to a point from which it can be distributed over a network. In a hierarchical telecommunication network, the backhaul portion of the network comprises the intermediate links between the core network, or backbone network, and the small subnetworks at the edge of the network. In contracts pertaining to such networks, backhaul is the obligation to carry packets to and from that backbone network. For ex:—, if there is any damage to the container and/or its wall, the impact sensors placed in container will send message to the RPMA concentrator and this concentrator connects to the RPMA AP to transmit information to data center through satellite backhaul connectivity and from data center, information is transmitted to customer's platform.

The "Sensor" WSNs are spatially distributed autonomous sensors to monitor physical or environmental conditions, such as temperature, sound, pressure, etc. and to cooperatively pass their data through the network to a main location.

The "remote data center's communications platform" herein refers to a customer's communications and data processing system and is available to all authorized by the center to receive the container related information. Access is not limited to a security company, shipping company, customs board & regulatory protection agency, the owner who has shipped the container, and/or the owner who is receiving the container but may include others authorized by the data center.

"User-defined events" herein refers to the different events during the shipping container's end-to-end supply chain transport including but not limited to any location reached, specific sensor data values, time, container door status and impact status. When these "user-defined events" occur, the present invention may trigger an alarm to have the system send alerts or messages.

"User-defined customer's platform" herein refers to customers who are authorized to receive information being sent to their remote data center about a particular container under user-defined circumstances such as when it reaches a particular location and/or one or more pre-defined events occur.

"User-defined message format" herein refers to the format of messages based on user's preferences, sent by either the Device or by remote data centers when a communication is required (e.g., triggering of alarm system), and is not limited to an audio message, text message, email message, or report in user's personal devices.

The present invention system also provides a number of other applications in addition to above described functionality and these include but are not limited to the following:
- a log of the items inside the container,
- information about which shipping company is in charge of each shipping segment,
- shipping consignment information,
- a log of each key event in the shipping process (e.g., when container loaded), and
- remote locking or opening of the shipping container to avoid theft.

SUMMARY

The present invention introduces new technologies to resolve the drawbacks of the prior arts and also in making intelligent and end to end decision during container transportation across one or more shipping segments. It provides shipping and receiving customers and other authorized personnel an accurate location for their shipping container(s) as well as each container's internal and external status and enables them to not only follow the shipping container's progress but to also remotely manage the containers during loading, unloading and transportation. The present invention consists of a RPMA Device put one to each container, an RPMA wireless network technology that communicates with this Device, and a networked, remote data storage system(s). The RPMA wireless network technology consists of one or more networked RPMA intermediate relay access points ("AP") with which each Device wirelessly communicates, and which transfers Device information with one or more remote data centers, and communicates with these centers. The remote data centers receiving Device information maintain an Internet or Intranet-visible database which these various customers can interrogate to manage their in-transit containers, and can be also used to send management instructions to the container while it is in-transit. The present invention provides an accurate location of container to the customers and also enable them to remotely manage the container during transportation by utilizing an RPMA wireless network technology. The present invention works by deploying one or more RPMA access points (AP) on-board container cargo to which the device communicates to transmit container information to the customer end. The present invention utilizes an RPMA tracking device which contains following components:
- an RPMA communication module
- a GPS module, and
- a battery unit.

The container to be tracked over shipping contains the following components:
- an RPMA concentrator, and
- a plurality of required sensors.

Each of these components will be described in more detail in the detailed description section of this document. In addition, the tracking device is set to sleep mode to save battery life and it wakes up to transmit the information of the container. In order to send the location information of the container to a customer's platform, the tracking device connect to the RPMA AP to transmit information to the data center through satellite backhaul connectivity and then to customer's platform where they can access the information.

The RPMA concentrator is the key component in communicating sensors data with customer's platform. It has a RPMA chip with a unique MAC address and is placed in each container to communicate each container's sensors data to customer's platform via RPMA wireless communication.

A variety of sensors can be placed inside the container to sense the different things such as temperature, humidity, chemical, radiation, pressure, damage, unauthorized door access etc. Each sensor has a unique ID to send unique data every time when a sensor sense a parameter, for example, if there is any damage to the container and/or its wall, the impact sensors placed in container will send message to the RPMA concentrator and this concentrator connects to the RPMA AP to transmit information to data center through satellite backhaul connectivity and from data center, information is transmitted to customer's platform. Similarly, door sensor senses the open or close status of container's door and send door status to the customer's platform via RPMA communication technology. The present invention always includes an appropriate acknowledgement of a successful receipt of a message from container and customer's platform that allows customer to calculate container movement, distance traveled and other location derivatives.

The present invention is a system that utilizes RPMA tracking unit (the "Device") which contains following components:
- an RPMA chip in each Device with a unique MAC address,
- the ability for the Device to communicate with all sensors on the container,
- the ability to aggregate/concentrate all sensor data in the Device,
- an RPMA wireless communication module to communicate with the RPMA network,
- a remote data center which receives all Device information over a network,
- a battery unit to power the Device, and
- a customer's platform to view the container information.

The shipping container to be tracked during its shipping also contains a plurality of required sensors in the container which communicate with the Device's RPMA concentrator. These sensors are based on customer's desires and are beyond the scope of this present invention.

Each of these components will be described in more detail later in this document. The Device is set to sleep mode most of the time to save battery life and it only wakes up to transmit container information at pre-defined times or when certain, user-defined events occur triggered by sensors or internal Device software programming.

In order to send container location information to a remote data center's communication platform, the tracking Device, one per container, first aggregates the shipping container's sensor information with the onboard GPS information, and then wirelessly connects to the RPMA AP which transfers this information to either another AP or to the remote data center where a database system is located which is connected to the Internet or Intranet for interrogation. Wireless communication by the Device is typically via satellite backhaul connectivity to and from the remote data center(s). The communication with one or more remote data center communication platforms about the container-related data is typically scheduled at pre-set intervals but may be user programmed to communicate when some anomalous event occurs.

Communicated data from the Device is analyzed by the remote data center for any alarm conditions based upon user-defined events for the container, and the remote data center may send alerts via email, text or other communication method to one or more user-defined customer platforms using a user-defined format in real-time or near real-time. The alert typically indicates that action needs to be taken and suggests actions or procedures depending on a number of factors including type of event, severity of event, single event or recurring event etc.

A variety of sensors can be placed inside the shipping container with each sensing different things such as temperature, humidity, chemical, radiation, pressure, damage to container, unauthorized door access etc. Each sensor has a unique ID and sends data every time the sensor senses a user-defined event. For example, if there is any damage to the container and/or its wall, the impact sensors placed in container will send a message to the RPMA concentrator within the container's Device and this concentrator connects wirelessly to the RPMA AP to transmit this information to the remote data center. Similarly, a door sensor senses the opening or closing status of container's door and sends the door status information to the remote datacenter's communication platform via the RPMA concentrator using the RPMA communication technology.

The present invention always includes an appropriate acknowledgement of a successful message receipt by the receiving party so that customers can be comfortable that the information is being correctly communicated. Having this secure communication system in place allows customers to calculate container movement, distance traveled, and container status and provide guidance to the container if anomalous events occur.

There also exists within the present invention a procedure on the Device or at a remote data center to generate a risk score for each container using information provided by the container's Device. This risk score can be generated by and displayed on the Device or at the remote server. If at the latter, this risk score may be discovered by a specific Device, by all Devices at location, or by the Internet and/or Intranet by authorized personnel. This risk score will help to assess the risk related to container during its transportation.

The present invention also includes an alarm system for any container damage detection and unauthorized door access of the container and send messages to the customer's platform in real-time. The present invention system also provides a number of other applications in addition to above described applications and are as follows:
 a means to log the items inside the container
 provides information about which shipping company is in charge of the container during the shipping
 store the shipping consignment information and log the shipping company information.
 remote locking or opening of the shipping container to avoid theft.

BRIEF DESCRIPTION OF DRAWINGS

The accompanying drawings illustrate the various embodiments of systems, methods, and other aspects of the present disclosure. Any person with ordinary skill in the art will appreciate that the illustrated element boundaries (e.g., boxes, groups of boxes, or other shapes) in the figures represent one example of the boundaries. In some examples, one element may be designed as multiple elements, or multiple elements may be designed as one element. In some cases, an element shown as an internal component of one element may be implemented as an external component in another and vice versa. Further, the elements may not be drawn to scale.

Various embodiments will hereinafter be described in accordance with the attached drawing which is provided to illustrate and not to limit the scope in any manner.

Each of FIG. 1

DETAILED DESCRIPTION

Figure 1:
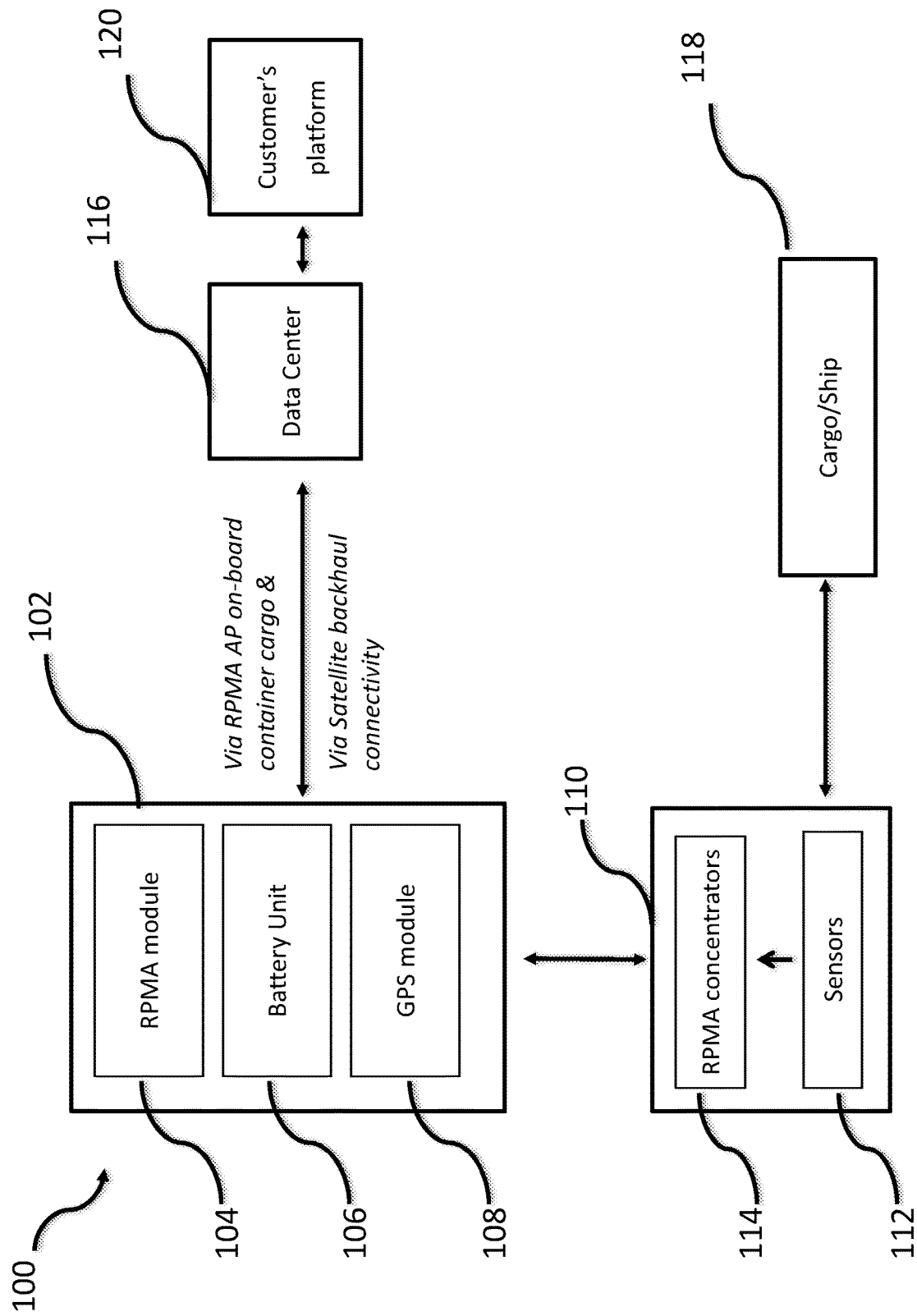

The present disclosure is best understood with reference to the detailed drawing and description set forth herein. Various embodiments are discussed below with reference to the FIG. 1 and FIG. 2 which are attached with this disclosure. However, those skilled in the art will readily appreciate that the detailed description given herein with respect to this figure are simply for explanatory purposes as the methods and systems may extend beyond the described embodiments. For example, the teachings presented and the needs of a particular application may yield multiple alternative and suitable approaches to implement the functionality of any detail described herein. Therefore, any approach may extend beyond the particular implementation choices in the following embodiments described and shown.

A person with ordinary skill in the art will appreciate that the systems, modules, and sub-modules have been illustrated and explained to serve as examples and should not be considered limiting in any manner. It will be further appreciated that the variants of the above-disclosed system elements, modules, and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules, and are not limited to any particular computer hardware, software, middleware, firmware, microcode, and the like.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure is not limited to the particular embodiment disclosed.

The present disclosure may be realized in hardware or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The additional objects and advantages of the present invention or disclosure will be set forth in part in the description which follows and in part will be obvious from the description or may be learned by practice of the invention.

Furthermore, the objects and advantages of the present disclosure will be realized and attained by means of the elements and combinations particularly pointed out in the appended claims.

The accompanying drawings which are incorporated in and constitute a part of this specification, illustrate embodiments of the present disclosure and together with the description serve to explain the principles of the present disclosure.

Present Invention Components

The present invention is a wireless, self-powered tracking device that is placed on/inside the shipping container one per container and connected to customer's platform or remote data center communication by utilizing a RPMA wireless network with RPMA AP mounted on-board container's shipping vessel (ship, truck, etc.) and possibly at intermediate locations between the Device's location and the location of the remote data center. The details of the RPMA technology are described below.

However, there can be any cargo carrying containers containing transportation goods for e.g. ships, truck, airfright etc. The details of the RPMA technology are described below.

The present invention system utilizes an RPMA tracking device (the device) to enable controlled end to end container transportation and container tracking, the system contains following components:

an RPMA communication module for tracking device,
a GPS module within tracking device,
a battery unit to power tracking device,
a container based RPMA concentrator,
a plurality of required sensors inside the container,
a data center which receives all devices information over a network and,
a customer's platform.

The present invention also provides a system that utilizes an RPMA tracking device (the "Device") to enable controlled end-to-end container transportation and container tracking, the system contains following components:

an RPMA chip in each Device with a unique MAC address,
the ability for the Device to communicate with all sensors on the container,
the ability to aggregate/concentrate all sensor data in the Device,
an RPMA wireless communication module to communicate with the RPMA network,
a remote data center which receives all Device information over a network,
a battery unit to power the Device, and
a customer's platform to view the container information.

DESCRIPTION OF DRAWINGS

FIG. 1 provides a diagram (100) of the technical infrastructure to accomplish the functionalities of the present invention which include these components. Each of these component blocks will be discussed in sequence.

Block 102—Tracking Device.

The key component in making the present invention to overcome the complexities of the prior art is the wireless, self-powered RPMA tracking device which is composed of a number of components described below and establish a wireless communication between shipping container 110 and a customer's platform 120 to achieve the objectives previously discussed. The present invention device 102 has a unique ID (i.e. MAC address) and each container 110 contains a unique tracking device to track each container containing goods for transportation. This device 102 will connect to the RPMA AP mounted on-board container cargo 118 and via satellite backhaul connectivity, device will transmit messages to data center 116 and then to customer's platform 120. This device 102 will have a very short memory to store the container related information for a very short time and in case any message couldn't get to datacenter 116, which may happen due to network congestion or some communication error, the device will store that message and send it again in the next scheduled time. In an aspect, the present invention can also be used for tracking container during land-based shipping or warehousing with RPMA device by connecting to Access points via RPMA communication wireless network and send container information to customer's platform 120 by utilizing LTE, WI-FI or other cellular communication network connectivity instead of satellite backhaul connectivity over sea communication.

Block 104—RPMA Communication Module.

This component is the communication module that provides the wireless communication between the shipping containers and the customer's platform and is RPMA communication module 104. The RPMA module 104 provides a low power Wide Area Network (LPWAN) having a wide geographic coverage and capacity for communicating with a number of Access points to transmit messages to the customer's platform 120 controlling and tracking container cargo, which allows for cost-effective connection in the license-free 2.4 GHz ISM band. Communication is done at fixed intervals and can be customized based on the customer desires to reduce battery drain.

Block 106—Battery Unit.

The device 102 includes a replaceable battery unit 106 and the device 102 is set to sleep mode to save battery life and wakes up when there is a need to transmit the messages. The present invention is configured to send battery status at a fixed interval to control centre (a customer's platform) 120 to know when to replace the battery so not to interrupt the communication during transit of container.

Block 108—GPS Module.

The device 102 includes a GPS module unit which enables the device 102 to transmit location information of the container 110 during its transit.

Block 110—Container.

Each container with a plurality of required set of sensors 112 and an RPMA concentrator 114, have a unique tracking device 102. The plurality of required sensors 112 can be temperature sensors, humidity sensors, pressure sensors, radiation sensors, chemical sensors, impact sensors, door sensors etc. These sensors 112 may include any sensors based on the customer's requirements and RPMA concentrators 114 have a unique MAC address that will help in knowing which container's data has been communicated between the container 110 and the data center 116. Further these sensors 112 inside the container 110 communicates to the RPMA Access Points through RPMA concentrator 114 using Bluetooth on different spectrums (i.e. 868 MHZ). In an embodiment, a smart e-lock (not shown in figure) can be implemented on the container 110 for remote locking or opening of the container 110 to prevent unauthorized access to the container 110. These smart lock will have a unique ID i.e. MAC address to remotely access each container lock.

Block 112—Sensors.

A plurality of required sensors 112 which can be placed in the container 110 based on the customer requirements. Since these sensors 112 don't have an RPMA chip so they communicate their data to the RPMA concentrators 114 which is placed near to the sensors 112.

Block 114—RPMA Concentrators.

The key component in transmitting sensor's data to the customer's platform is RPMA concentrator. The RPMA concentrator 114 having a unique MAC address connect to AP mounted on board container cargo over sea 118 and transmit data to datacenter 116 via satellite backhaul connectivity, and to customer's platform 120. More specifically, the RPMA concentrator 114 have an RPMA chip (with a unique MAC address) on board that allows to send data to RPMA access points placed on board container cargo 118 via Bluetooth and then RPMA access points send data to the data center 116 via satellite backhaul connectivity and from data center data is send to customer's platform 120. In an aspect, the RPMA concentrators 114 are placed preferably inside the container 110 to protect them from weather conditions.

Block 116—Data Center.

A data center 116 is where all tracking devices information, notifications and messages are sent to and is a main distribution unit that receives messages from all tracking devices on the network, and then send the messages to their recipients that are different customer's platform 120. Therefore, this component 116 is the main receiving center for container transportation information.

Block 120—Customer's Platform.

A Customer's platform 120 is where customers can view different information related to tracking devices, for example: alarm systems, messages acknowledgement system etc. Whenever the message is communicated to the customer's platform 120, there will be an appropriate acknowledgement for receiving the message from the container 110. This will further help customers to calculate container 110 movement, distance traveled and other location derivatives. The customer platform 120 includes but not limited to theft recovery system, cargo insurance system, law enforcement system, customs and border protection systems, owner etc. The information output at the customer's platform 120 is in the form of an interactive display of the container information including their location, temperature, humidity, damage, loss etc. The outputs are the graphical representation of the above described container related information which can be downloaded. Further, the customer's platform 120 computer store and maintain the historical info of the container transportation.

The connection between the cargo container 110 and the data center 116 is via RPMA access points which are deployed on-board container cargo 118. The RPMA device 102 which can be mounted outside the container 110 or inside the container 110, connect to RPMA AP via RPMA wireless network technology and send messages to data center 116 via satellite backhaul connectivity. The Data center 116 is the place where all the messages and information of all devices in the region are gathered. So all messages sent from different devices are received in the data center 116 first, then each message is directed to its customer's platform 120. The device 102 enable the customers to remotely control the end to end logistic operations including tracking container's location, monitoring the container's internal conditions and making intelligent decisions in case of any container transportation irregularity. This can be done by placing a plurality of sensors 112 inside the container 110 to sense different conditions of the container 110 such as damage, loss, temperature, humidity etc. Sensors 112 communicate to RPMA concentrator 114 which has a unique MAC address and sends the sensed data to the data center 116 via RPMA access points and satellite backhaul connectivity. All data from different devices received at data center 116 is directed to its customer's platform 120. The above mentioned end to end logistic control objective of the present invention also includes a smart e-lock system by which container's lock can be accessed remotely by the control centre.

Figure 2:
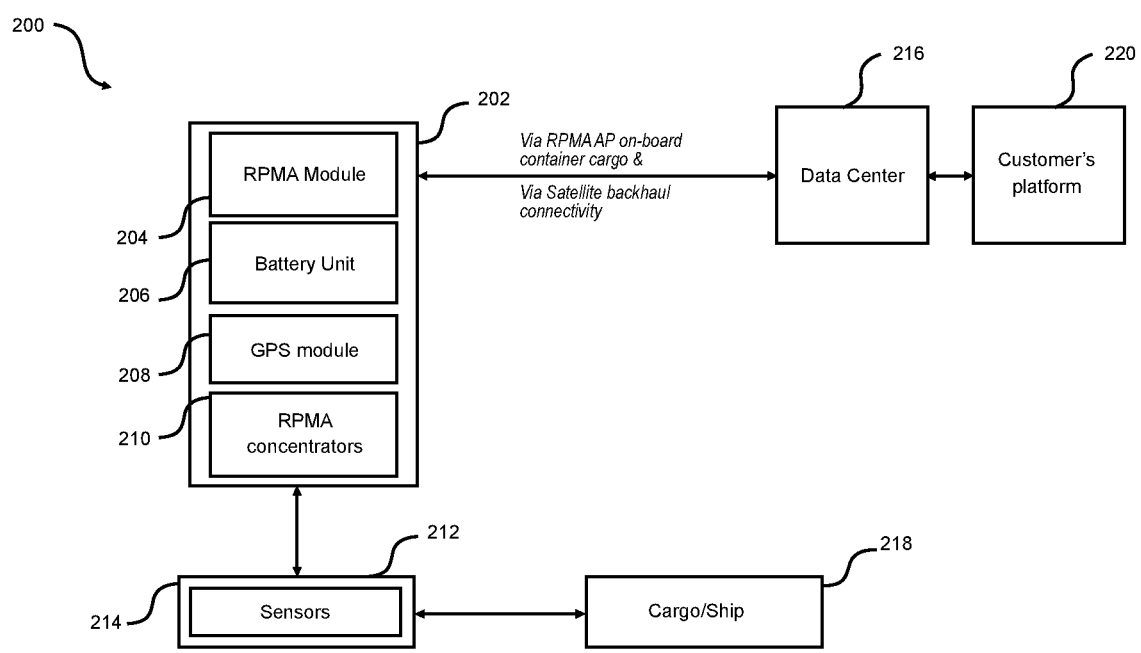
FIG. 2 illustrates block diagram of the technical infrastructure to accomplish the functionalities of the present invention to utilize a low power wide area (LPWA) wireless communication network i.e. Random Phase Multiple Access (RPMA) network, for end to end logistic chain control and tracking containers over sea, land, air and/or containers in warehouses.

FIG. 2 provides a diagram (200) of the technical infrastructure to accomplish the functionalities of the present invention which include these components. Each of these component blocks will be discussed in sequence.

Block 202—Tracking Device.

The key component in making the present invention to overcome the complexities of the prior art is the wireless, self-powered RPMA tracking device which is composed of a number of components described below and establishes a wireless communication between shipping container 212 and a customer's remote data center platform 220 to achieve the objectives previously discussed. The present invention device 202 has a unique ID (i.e. MAC address) and each container 212 contains a unique tracking device to track each container containing goods for transportation. This device 202 will connect to the RPMA AP mounted on-board the shipping vessel (e.g., a container cargo) 218 and via satellite backhaul connectivity, device will transmit messages to data center 216 and then to the remote data center's communication platform i.e. customer's platform 220. This device 202 will have a very short memory to store the container related information for a very short time and in case any message couldn't get to datacenter 216, which may happen due to network congestion or some communication error, the device will store that message and send it again in the next scheduled communication time.

In an aspect, the present invention can also be used for tracking container during sea-based shipping, land-based shipping or warehousing with the RPMA device by connecting to Access Points ("AP") via RPMA communication wireless communication network and send container information to customer's platform 220 by utilizing LTE, WI-FI or other cellular communication network connectivity instead of satellite backhaul connectivity over sea communication.

Block 204—RPMA Communication Module.

This component is the communication module that provides the wireless communication between the Device on the shipping containers and the customer's platform and is RPMA wireless communication module 204. The RPMA module 204 provides a low power Wide Area Network (LPWAN) having a wide geographic coverage and has the capacity to communicate with a number of Access points to ultimately wirelessly transmit messages via a cost-effective, license-free 2.4 GHz ISM band connection to the customer's platform 220 which allows the customer to track and control the container's cargo. Communication is typically done at fixed intervals but can be user-customized to communicate upon certain alert triggers from sensors or internal Device programming. Whichever communication approach is chosen is usually based on the customer desires to reduce Device battery drain.

Block 206—Battery Unit.

The device 202 includes a replaceable battery unit 206 and the device 202 is set to sleep mode to save battery life and wakes up when there is a need to transmit the messages. The present invention is configured to send battery status at a fixed interval to one or more control centers (a customer's remote data communication platform) 220 to know when to replace the battery so not to interrupt the communication during transit of container.

Block 208—GPS Module.

The device 202 includes a GPS module unit which enables the device 202 to transmit location information of the container 212 during its transit as well as during its loading/unloading.

Block 210—RPMA Concentrator.

The key component in transmitting sensor's data to the customer's remote data center platform is RPMA concentrator. The RPMA concentrator 210 has a unique MAC address and it wirelessly can connect to AP mounted onboard the shipping vessel (e.g., truck, ship, barge, etc.) over sea or land 218 and transmit aggregated container data to datacenter 216 via satellite backhaul connectivity, and ultimately to the customer's platform 220. Typically, the RPMA concentrator 210 are placed preferably inside the container 212 to protect them from weather conditions.

Block 212—Container.

Each container has a plurality of required sensors 214 and an RPMA concentrator 210, which is a part of the unique tracking device 202. The plurality of required sensors 214 can be temperature sensors, humidity sensors, pressure sensors, radiation sensors, chemical sensors, impact sensors, door sensors etc. These sensors 214 may include any sensors based on the customer's requirements and the RPMA concentrator 210 has a unique MAC address that will help in knowing which container's data has been communicated between the container 212 and the remote data center 216. Further these sensors 214 inside the container 212 communicates to the RPMA Access Points through RPMA concentrator 210 using Bluetooth on different spectrums (i.e. 868 MHZ) or other user-selected communication technologies.

One embodiment of the present invention, a smart e-lock (not shown in figure), can be implemented on the container 212 for remote locking or opening of the container 212 to prevent unauthorized access to the container 212. The smart lock on each container will have a unique ID i.e. MAC address to remotely access each container lock.

Block 214—Sensors.

A plurality of required sensors 214 which can be placed in the container 212 based on the customer requirements. Since these sensors 214 don't have an RPMA chip but they do communicate their data to the RPMA concentrator 210 which is placed near to the sensors 214 using Bluetooth or other communication technology.

Block 216—Customer Remote Data Center.

A customer remote data center 216 is where all tracking devices information, notifications and messages are sent. It is the main distribution point that receives messages from all tracking devices on the network, stores the container information, and then sends the messages to recipients 220 that are different from those authorized to use this customer's platform. The RPMA AP wirelessly transmits information to the remote data center(s) 216 via satellite backhaul connectivity. One or more remote server at one or more data centers 216 can be programmed by user(s) to communicate with the device 202 attached to the container to define one or more communication events detected by the device 202 and sensors 214 that will trigger either message generation or other procedural action by the device 202. The messages sent to remote server by the device 202 can be accessible to authorized personnel via Internet, Intranet or both. The remote server can generate risk score that will describe the safety of each container by analyzing data received from each container connected device and this score can be found or displayed also on the device or on the remote server by a specific device or by all devices at location or by the Internet and/or Intranet by authorized personnel. Therefore, this component 216 is the main receiving center for container transportation information.

Block 220—Customer's Platform.

A Customer's platform 220 is where customers can view different information related to tracking devices, for example: alarm systems, messages acknowledgement system etc. The Customer's platform 220 is typically online and accessible via the Internet or Intranet. Whenever any message is communicated from the container 212 to the customer's platform 220, there will be an appropriate acknowledgement return message acknowledging accurate message receipt. This platform is designed to help customers calculate container 212 movement, distance traveled and other location parameters. The customer platform 220 includes information that can help with theft recovery, cargo insurance, law enforcement, customs and border protection, and owner asset tracking among other applications not herein listed. The information output at the customer's platform 220 is in the form of an interactive display showing container information for one or more containers for which the user has been authorized. This information includes the location, temperature, humidity, damage, loss, etc. about these containers. The outputs are graphically shown and the related information can be downloaded to the authorized user's computer. Further, the customer's platform 220 computer can store and maintain the historical info of the container transportation, not just the current status.

The information about container 212 status is based on user-defined events which allows a user to define a device 202 procedure or device 202 action, for example, when a particular emergency event, alert and/or a specific action or procedure needs to be taken immediately and is to be implemented by the Device 202 software. These triggered procedures can then control the Device 202 behavior including, but not limited to, how frequently it communicates with the remote data center, and what data will be transmitted. These actions can also control control/affect the shipping conditions of the container 212 based upon the container's status by communicating these alerts to the staff controlling the shipment. For instance, if an unauthorized door access event occurs, a police car may be rushed to the container's site to handle the situation, or if temperature is not at some preset threshold, a technical person may be immediately called to fix the problem.

The wireless connection between the Device on the cargo container 212 and the remote data center 216 is via the intermediate, relay communication RPMA Access Points ("AP") which are typically deployed on-board the shipping vessel 218. The RPMA Device 202 which can be mounted outside the container 212 or inside the container 212, connects to RPMA AP via RPMA wireless network technology and sends messages to data center 216 via satellite backhaul connectivity. The remote data center 216 is the place where all the messages and information regarding all Devices in the region are gathered, stored and reported upon. All messages sent from different Devices are received in the data center 216 first, then each message is directed to the appropriate customer's platform 220. The Device 202 then enables the Customers to remotely control the end-to-end logistic operations including tracking container's location, monitoring the container's internal conditions and making intelligent decisions in case of any container transportation irregularity. This container status monitoring is done by placing a plurality of sensors 214 inside the container 212 to sense different conditions of the container 212 based on a user-defined event(s) such as damage, loss, temperature, humidity etc. Sensors 214 communicate to the RPMA concentrator 210 within the Device which has a unique MAC address and the concentrator module sends the sensed data to the data center 216 via the RPMA Access Points and satellite backhaul connectivity. All data from different devices received at data center 216 is directed to its customer's platform 220. The above mentioned end-to-end logistic control objective of the present invention also includes a smart e-lock system by which container's lock can be accessed remotely by the control centre.

The invention claimed is:

1. A system for wirelessly providing container associated information, including at least information about container location, security status, impact status and container internal status for one or more containers on a transport vehicle/vessel during shipping, wherein the container information system is comprised of at least the following components:
   a tracking device mounted on one or more containers;
   a variety of sensors associated with the container to provide container information;
   a Random Phase Multiple Access RPMA wireless communication concentrator;
   one or more RPMA wireless network intermediate relay Access Points mounted at the container storage location, including a ship, to relay container information to one or more remote data servers;
   an alarm system to generate alerts on user definable events affecting the container;
   a remote data center communication platform to wirelessly receive the information from the container and to transmit information to the container to adjust the remote data collection protocol for the container;
   a communication acknowledgement protocol that acknowledges successful receipt of a message for both the container and the remote data center's communication platform;
   wherein the device sends location information for the container at least at the following events:
      during container's loading,
      during the container's unloading,
      during entering and exiting a designated location that is part of the container's pre-defined supply chain shipping movement, and
      in the event one or more user programmed alerts occur based upon the container status;
   wherein the tracking device wirelessly sends location and geo-fencing information for the container to intermediate RPMA communication relay points ("Access Points" or "AP") through the RPMA wireless communication network;
   wherein the RPMA AP transmits either wired or wirelessly information to either another AP or to the remote data center via satellite backhaul connectivity to and from the remote data center's communication platform;
   wherein the variety of sensors monitoring the container's internal status contains at least a temperature sensor, a humidity sensor, an impact sensor, a door open and closure sensor, a chemical sensor, a radiation sensor, other sensors relevant to the container's contents, and a combination thereof and sensors provide information about the container's internal environment including at least temperature, humidity, any damage information to the container and/or its walls and any unauthorized container door access in order to maintain a good health of the items inside the container and to maintain and document container security;
   wherein the variety of sensors associated with a container wirelessly send information to the RPMA data concentrator which aggregates information from various sources and manages external wireless communication directly to the AP or to the remote data center;
   wherein the RPMA concentrator wirelessly sends information about its container to the RPMA AP through RPMA wireless network or directly to a data server at one or more remote data centers;
   wherein the container's alarm system is pre-set to generate an alert, notification and/or report in response to at least one user-definable event based upon sensor data with the event selected from a location, a time, a sensor input value, a specific Device temperature status, container's door status and impact status and this alert is wirelessly communicated to one or more remote data centers communication platform in real-time;
   wherein the remote data center's communication platform is at least of a security company, shipping company, customs board & protection agency, the owner who shipped the container, and/or the owner who is receiving the container;
   wherein the acknowledgement of successful receipt of a message from container by the remote data center's communication platform allows each remote data center to calculate container movement, distance traveled and other location derivatives;
   wherein the system provides information about which shipping company is in charge of the container at various times during the shipping, stores the shipping consignment and shipping company information in the Device and wirelessly communicates this information to the remote data center platforms; and
   wherein the system provides the ability to lock/unlock the container remotely from any authorized remote data communication platform by implementing a smart lock system on the container, the system comprising a unique ID (MAC address) for each lock and a unique authentication code for each lock.

2. The system of claim 1, wherein the tracking Device is set to sleep mode to save battery life and it wakes up to transmit the information of the container when certain, user-defined events occur.

3. The system of claim 1, wherein the tracking Device is user programmable to note the ultimate and/or intermediate location destination(s) and generate an event when it has arrived at a given destination.

4. The system as claimed in claim 1, wherein the tracking Device comprises a GPS unit to provide the accurate location and geo fencing information of the container at one or more locations for the container's supply chain.

5. A method for controlling and tracking of shipment of one or more containers, the method comprising the steps of:
   collecting the location information of the containers with a GPS system;
   collecting at least one container's status information from a group consisting of temperature, humidity, impact, door status and combination thereof with the help of a variety of sensors placed inside the container;

wirelessly communicating the above information data at pre-set intervals to one or more remote data center(s) via Random Phase Multiple Access RPMA wireless communication module, processing the data with the remote data processing unit to determine if an alarm condition exists, acknowledge successful receipt of a message for both the container and the remote data center's communication platform, and generate alerts/notification/report to notify receiver about the alarming condition of the container;

wherein the device sends location information for the container at least at the following events:
  during container's loading,
  during the container's unloading,
  during entering and exiting a designated location that is part of the container's pre-defined supply chain shipping movement, and
  in the event one or more user programmed alerts occur based upon the container status;

wherein a tracking device wirelessly sends location and geo-fencing information for the container to intermediate RPMA communication relay points ("Access Points" or "AP") through the RPMA wireless communication network;

wherein the RPMA AP transmits either wired or wirelessly information to either another AP or to the remote data center via satellite backhaul connectivity to and from the remote data center's communication platform;

wherein the variety of sensors monitoring the container's internal status contains at least a temperature sensor, a humidity sensor, an impact sensor, a door open and closure sensor, a chemical sensor, a radiation sensor, other sensors relevant to the container's contents, and a combination thereof and sensors provide information about the container's internal environment including at least temperature, humidity, any damage information to the container and/or its walls and any unauthorized container door access in order to maintain a good health of the items inside the container and to maintain and document container security;

wherein the variety of sensors associated with the container wirelessly send information to an RPMA data concentrator which aggregates information from various sources and manages external wireless communication directly to the AP or to the remote data center;

wherein the RPMA concentrator wirelessly sends information about its container to the RPMA AP through RPMA wireless network or directly to a data server at one or more remote data centers;

wherein the container's alarm system is pre-set to generate an alert, notification and/or report in response to at least one user-definable event based upon sensor data with the event selected from a location, a time, a sensor input value, a specific device temperature status, container's door status and impact status and this alert is wirelessly communicated to one or more remote data centers communication platform in real-time;

wherein the remote data center's communication platform is at least of a security company, shipping company, customs board & protection agency, the owner who shipped the container, and/or the owner who is receiving the container;

wherein the acknowledgement of successful receipt of a message from container by the remote data center's communication platform allows each remote data center to calculate container movement, distance traveled and other location derivatives;

wherein the system provides information about which shipping company is in charge of the container at various times during the shipping, stores the shipping consignment and shipping company information in the Device and wirelessly communicates this information to the remote data center platforms; and wherein the system provides the ability to lock/unlock the container remotely from any authorized remote data communication platform by implementing a smart lock system on the container, the system comprising a unique ID (MAC address) for each lock and a unique authentication code for each lock.

6. The method as claimed in claim 5, wherein the alerts/notification/reports are generated on user-definable events, which may include arrival at a location, a sensor input value, a specific Device temperature status, container's door status and impact status and each Device generated alert is generated in user-defined format to a user-defined receiver.

7. The method as claimed in claim 6, wherein the alert initiates one or more specific user-defined actions or procedures which need to be taken and implemented for the container and these procedures are stored locally in the Device's software but can also be downloaded from one or more remote data communication platforms.

8. The method as claimed in claim 7, further enable the user to manage single event or recurring event differently.

9. The method as claimed in claim 8, further generates a risk score with the help of user programmed remote server at a remote data center to increase the safety of each container and this risk score can be found and displayed on the Device or on the remote server by a specific Device or by all Devices at location, or by the Internet and/or Intranet by authorized personnel.

* * * * *